United States Patent
Noest et al.

(10) Patent No.: US 11,101,841 B2
(45) Date of Patent: Aug. 24, 2021

(54) ADAPTIVE SELF-INTERFERENCE CANCELLATION

(71) Applicant: Intel Corporation, Santa Clara, CA (US)

(72) Inventors: Peter Noest, Munich (DE); Andreas Menkhoff, Oberhaching (DE)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 16/668,362

(22) Filed: Oct. 30, 2019

(65) Prior Publication Data

US 2020/0067591 A1 Feb. 27, 2020

(51) Int. Cl.
| | |
|---|---|
| *H04B 1/525* | (2015.01) |
| *H04B 7/08* | (2006.01) |
| *H04B 17/21* | (2015.01) |
| *H04B 17/00* | (2015.01) |

(52) U.S. Cl.
CPC ........... *H04B 1/525* (2013.01); *H04B 7/0857* (2013.01); *H04B 17/0085* (2013.01); *H04B 17/21* (2015.01)

(58) Field of Classification Search
CPC ...... H04B 1/525; H04B 7/0857; H04B 17/21; H04B 17/0085; H04B 1/123
See application file for complete search history.

(56) References Cited

U.S. PATENT DOCUMENTS

| | | | | |
|---|---|---|---|---|
| 6,539,204 B1* | 3/2003 | Marsh | ................... | H04B 1/123 455/296 |
| 7,236,238 B1* | 6/2007 | Durresi | .............. | H04B 10/0775 356/73.1 |
| 2003/0156632 A1* | 8/2003 | Dowling | ........... | H04L 25/03878 375/222 |
| 2020/0119763 A1* | 4/2020 | Elmaghraby | .......... | H04B 1/525 |

FOREIGN PATENT DOCUMENTS

| | | | | |
|---|---|---|---|---|
| JP | 4056386 B2 * | 3/2008 | ............... | H04B 7/04 |
| JP | 4188079 B2 * | 11/2008 | ............. | H04L 25/06 |

* cited by examiner

*Primary Examiner* — Tejis Daya
(74) *Attorney, Agent, or Firm* — 2SPL Patent Attorneys PartG mbB; Yong Beom Hwang (57) ABSTRACT

Systems, circuitries, and methods are disclosed that generate an interference replica signal that estimates interference in a receive signal that is due to a transmit signal. The interference replica signal is combined with the receive signal to generate a corrected receive signal. The method includes quantizing the transmit signal to generate a quantized transmit signal; weighting the quantized transmit signal based on one or more quantization weights; filtering the weighted quantized transmit signal based on two or more filter weights to generate the interference replica signal; and determining the quantization weights and the filter weights based on the corrected receive signal.

23 Claims, 7 Drawing Sheets

ADAPTIVE SELF-INTERFERENCE CANCELLATION

BACKGROUND

Self-interference in a transceiver occurs when a transmit signal causes interference in a receive signal and vice versa. One technique for addressing self-interference is to estimate an interference contribution of a transmit signal to a receive signal and then cancel the estimated interference from the received signal.

DESCRIPTION

Figure 1:
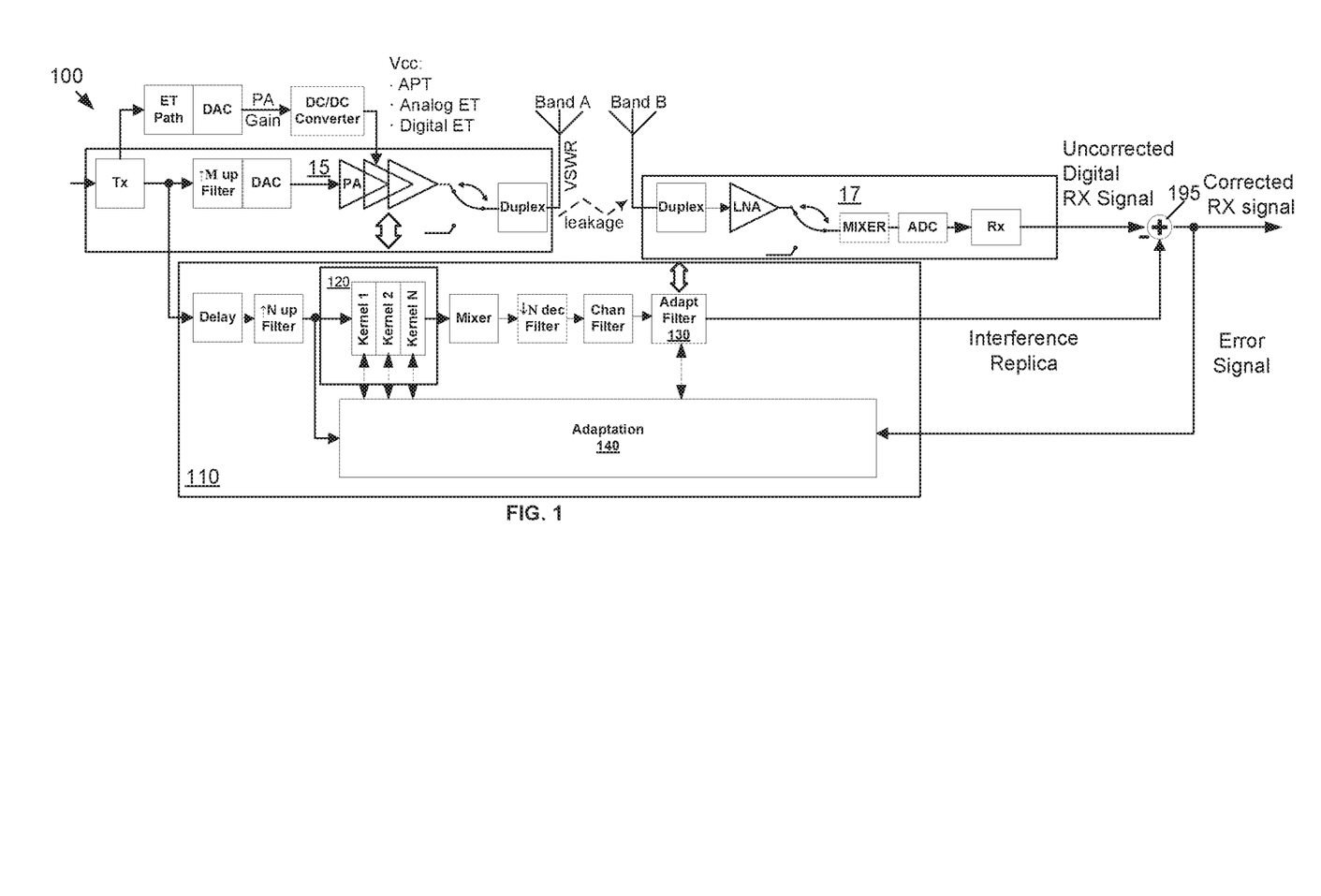
FIG. 1 illustrates an exemplary transceiver that includes an adaptive self-interference cancellation system in accordance with various aspects described.

FIG. 1 illustrates an exemplary transceiver 100 that includes a dual layer adaptive self-interference cancellation (SIC) system. The transceiver 100 includes a front end with a transmit chain 15 that processes signals for transmission in Band A and a receive chain 17 that processes signals received in Band B. The transmit chain includes one or more power amplifiers (PA) that amplify the RF transmit signal and a duplexer that filters out TX signal components outside of Band A. The receive chain includes a duplexer that filters out receive (RX) signal components outside of Band B and low noise amplifier (LNA) that amplifies the RX signal. An analog to digital converter (ADC) converts the RX signal to a digital signal for decoding.

There are many sources of transmit (TX) signal interference in the RX signal. Nonlinear impairments of the RX signal due to the PA in the transmit chain include TX signal adjacent channel leakage (ACLR), second, third and higher harmonics of the TX signal and TX ACLR that are caught by an RX signal spur, and/or the intermodulation of two TX signals can leak into the receive path by spurious reception and lack of isolation. Linear distortion of the RX signal due to the TX signal is caused by leakage between the TX duplexer and the RX duplexer.

To cancel self-interference, the transceiver 100 includes a dual layer SIC system that includes an adaptive interference replica system 110 that generates an interference replica signal that estimates transmit signal interference in a receive signal. The dual layer SIC system also includes combination circuitry 195 that combines the interference replica signal with a receive signal to generate a corrected receive signal. In a first layer, the interference replica system 110 includes an adaptive quantizer circuitry 120 that models the nonlinear interference in the RX signal due to the PA in the transmit chain.

In a second layer, the interference replica system 110 also includes an adaptive filter 130 that filters the output of the adaptive quantizer circuitry to model the linear distortion due to leakage between the TX duplexer and the RX duplexer. In other words, the adaptive filter 130, which in some examples is a finite impulse response (FIR) filter models the frequency response of the coupling path (e.g. the duplexer frequency response). Adaptation circuitry 140 adapts operation of the adaptive quantizer circuitry 120 and the adaptive filter 130 in a manner that minimizes the error signal.

In contrast to the dual layer SIC system of FIG. 1, existing single layer SIC systems often utilize a single processing component that rebuilds both the linear and nonlinear components of the distortion signal and subtracts this estimated distortion signal from the RX signal, hence improving RX signal quality and throughput. The single layer SIC system uses a polynomial series that models the distortion signal. By way of example, one type of distortion is a third harmonic of the TX signal that leaks into the RX channel. Single layer SIC systems adapt the coefficients for the amplitude part of the TX signal of order e.g. 3,5,7 and apply three times the input TX phase (essential characteristic of third harmonic). To model the third harmonic distortion, the SIC circuitry 30 iteratively adapts the three complex coefficients or solves an equation system. This polynomial solution leads to accuracy problems in bit true realizations, resulting in poor cancellation performance. For example a seventh order polynomial term can produce very large numbers and suffers on fixed point or integer representation. Also the polynomial approach with limited number of coefficients (e.g. 3) can only approximate continuous functions and is not good in approximating non-continuous functions like step functions.

Described herein are systems, circuitries, and methods that provide a dual layer approach to SIC. In a first layer, the described systems, circuitries and methods adaptively quantize the transmit signal in a manner that readily approximates step functions and highly nonlinear functions and does not suffer from the numeric range problems of high order polynomial approaches. The second layer includes an adaptive filter that filters the quantized transmit signal in a manner that reflects linear distortions of the RX signal due to the TX signal.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

Use of the word example is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

Figure 2:
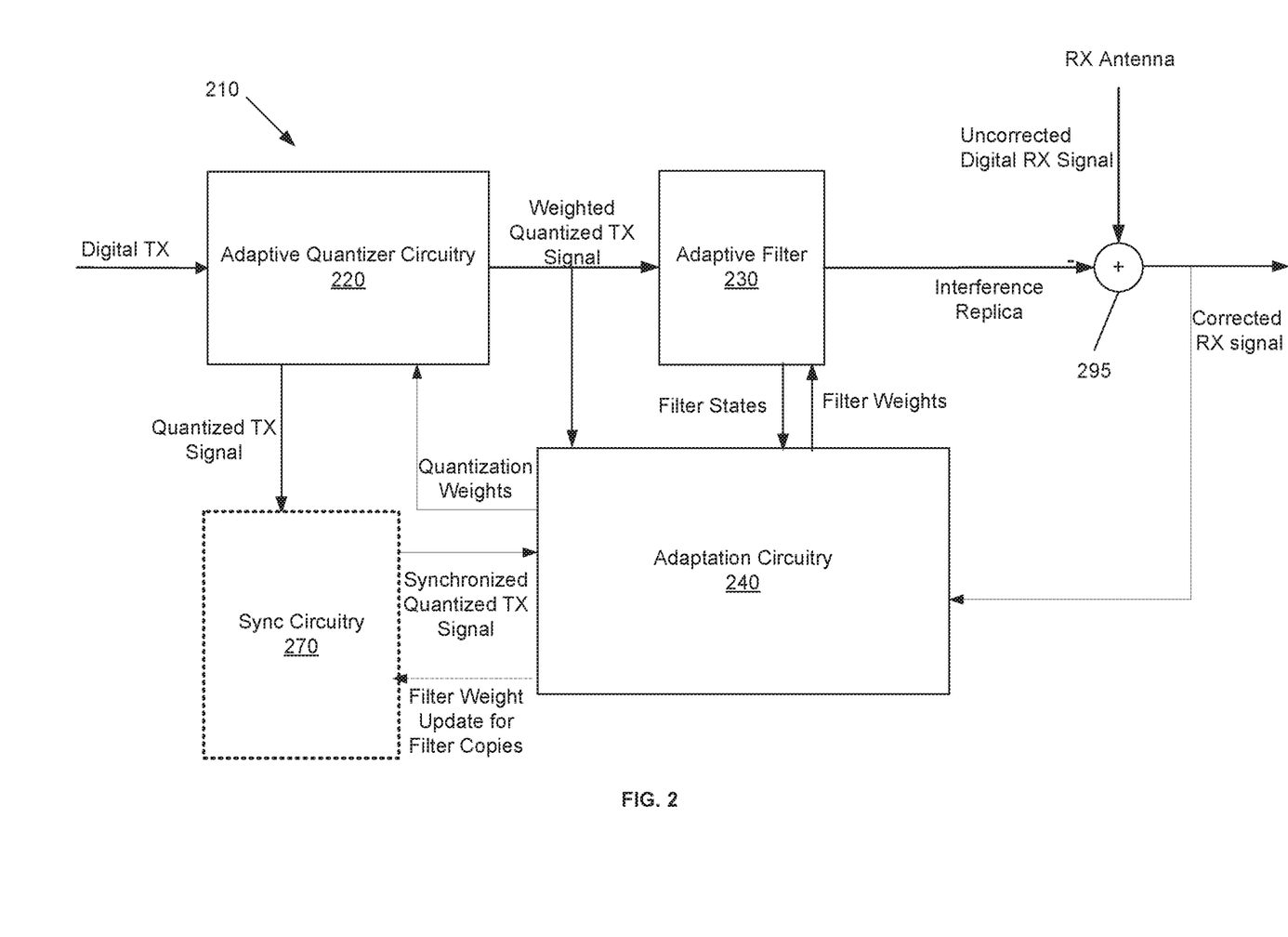
FIG. 2 illustrates an exemplary adaptive self-interference cancellation system in accordance with various aspects described.

FIG. 2 illustrates an exemplary interference replica system 210 configured to generate an interference replica signal that estimates interference in a receive signal that is due to a transmit signal. The interference replica signal is combined with the receive signal to generate a corrected receive signal. The interference replica system includes an adaptive quantizer circuitry 220, an adaptive filter 230, and adaptation circuitry 240. The adaptive quantizer circuitry 220 is configured to quantize the transmit signal to generate a quantized transmit signal. The adaptive quantizer also weights the quantized transmit signal based on one or more quantization weights. The adaptive filter 230 is configured to filter the weighted quantized transmit signal based on two or more filter weights to generate the interference replica signal. As will be described in more detail below, the adaptation circuitry 240 is configured to determine the quantization weights and the filter weights based on the corrected receive signal, the quantized transmit signal, the weighted quantized transmit signal, and filter states of the adaptive filter. Optional sync circuitry 270 synchronizes the quantized transmit signal in the adaptation circuitry 240 with the weighted quantized transmit signal in the adaptive filter 230. As will be described in more detail below, the sync circuitry 270 includes copies of the adaptive filter 230, whose weights are also updated by the adaptation circuitry 240.

Figure 3A:
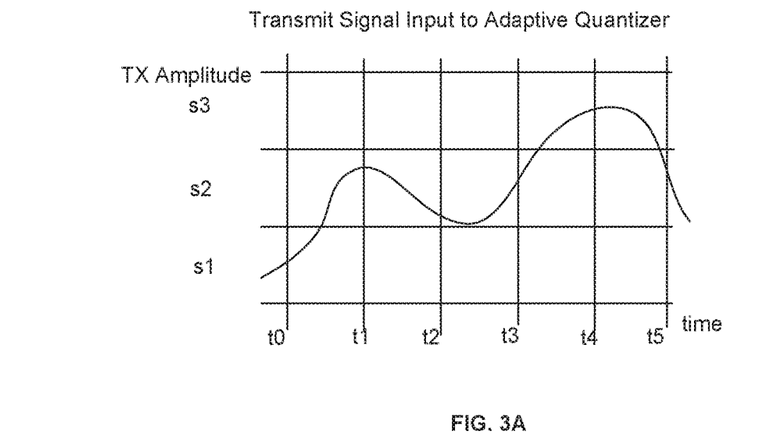
FIGS. 3A and 3B illustrate a transmit signal and a corresponding quantized transmit signal in accordance with various aspects described.
Figure 3B:
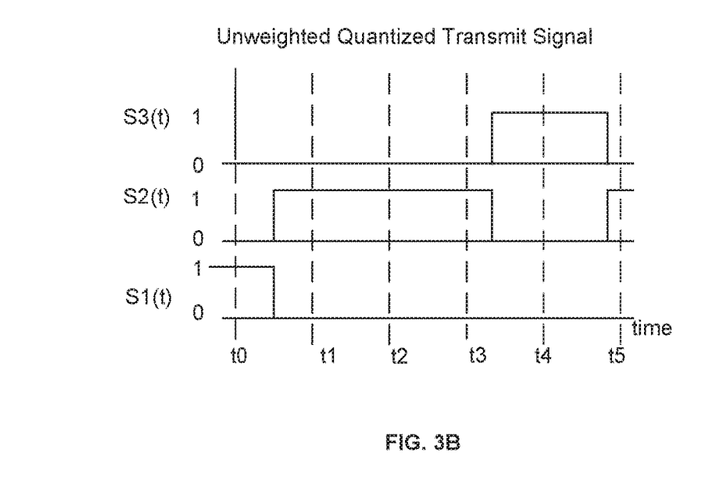

In one example, the adaptive quantizer circuitry 220 includes a quantizer portion that receives the amplitude information of the digital TX signal and quantizes the amplitude into even spaced or unevenly spaced amplitude segments. FIGS. 3A and 3B illustrate quantization of a transmit signal shown in FIG. 3A into a set of amplitude segments shown in FIG. 3B. Each amplitude segment in the quantized transmit signal corresponds to a range of amplitudes for the transmit signal and each amplitude segment has a normalized amplitude value (e.g., 1) when the transmit signal has an amplitude within the range of amplitudes and a value of 0 otherwise. Amplitude segments may be discontinuous as with segment S2 when the TX amplitude returns to the second amplitude range. Using the illustrated quantization approach, nonlinearities of any kind can be rebuilt in a very versatile and numerically stable way (e.g., no numeric range issues like high order polynomial series approach may have). Since only one segment has a non-zero amplitude at each time, the segmented output signals ($S1(t)$-$S3(t)$ of FIG. 3A) can be considered as perfectly orthogonal, and can be expected to make different kernel terms.

Figure 4:
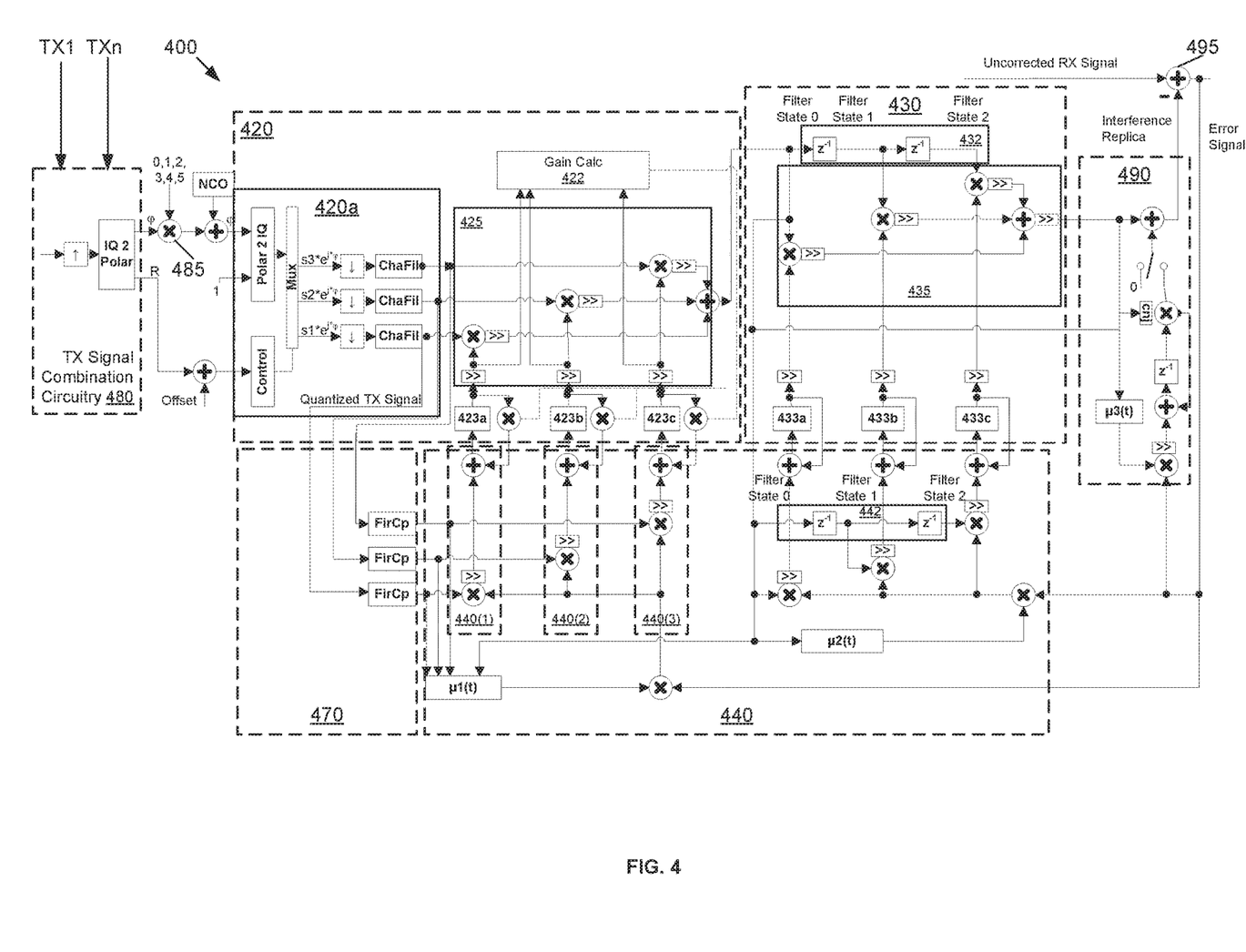
FIG. 4 illustrates an exemplary adaptive self-interference cancellation system in accordance with various aspects described.

FIG. 4 illustrates an exemplary transceiver 400 that includes a dual layer SIC system. The dual layer SIC system includes an interference replica system with adaptive quantizer circuitry 420 and quantizing portion 420a, sync circuitry 470, adaptive filter 430, adaptation circuitry 440, and image cancellation circuitry 490. The quantizing portion 420a includes a control circuitry that controls a multiplexer to output one of the amplitude segments based on an offset value (that quantifies the amplitude ranges of the amplitude segments). While for simplicity sake, the adaptive quantizer 420 quantifies the transmit signal into three segments, in other examples a different number of segments (e.g., 1, 2, 9, or 16) are used. The amplitude ranges represented by each segment may be fixed or adaptable and may have equal or unequal size To model the nonlinear distortion of the RX signal due to the TX signal, the adaptive quantizer 420 includes a multiplication network or "weighting circuitry" 425 that puts real or complex quantization weights 423a-423c on each amplitude segment in the quantized TX signal. For the purposes of this description, the weighted amplitude segments incorporate complex numbers having real and imaginary parts and the quantization weights are also complex numbers. The quantization weights 423a-423c are stored in memory (e.g., registers), and can be conceptualized as adaptable lookup table entries. Since the adaptive quantizer circuitry 420 is modeling a nonlinear behavior, oversampling at its input may be used.

The adaptation circuitry 440 includes quantization weight determination circuitries 440(1)-440(3). Each of the quantization weight determination circuitries is associated with an amplitude segment output by the quantization portion 420a. Each quantization weight determination circuitry includes a set of hardware components and/or processors configured to determine a quantization weight 423a-423c to be applied to the amplitude segment to minimize the error signal. The adaptation algorithm used by the quantization weight determination circuitries can be, for example, an iterative least mean squares (LMS) based approach like normalized least mean squares (NLMS), extended least mean squares (XLMS), recursive least squares (RLS), or any other appropriate algorithm. While in FIGS. 4 and 5, the adaptation circuitry is illustrated as hardware components, in other examples a processor may perform some or all of the functions performed by hardware components in the adaptation circuitry.

The adaptive filter 430 includes a delay chain 432 that delays the weighted quantized transmit signal into filter states (in the illustrated example there are three filter states, however any number of filter states, greater than one, may be used). Each filter state is weighted by a filter weight 433a-433c, which is determined by the adaptation circuitry 440. The adaptation circuitry 440 determines the filter weights based on the error signal and the current filter states (recreated by delay chain 442), which are delayed versions of the weighted quantized transmit signal.

During adaptation of the quantization weights, the segmented streams with normalized amplitude of the quantized transmit signal may be synced by the sync circuitry 470. The sync circuitry 470 includes, in a signal path for each amplitude segment, a replica of the adaptive filter circuitry 430. The sync circuitry 470 includes effects of decimation filters, channel filters, and a copy of the adaptive filter. The copy of the adaptive filter (FirCP) may be updated as the adaptive filter 430 is modified during training. The sync circuitry 470 provides proper frequency shaped and proper timing aligned signals from perspective of the error signal, enabling enhanced adaptation conditions for the quantization weights. In the illustrated example, the adaptive filter 430 is a FIR filter with three filter taps. FirCp in the sync circuitry 470 is a copy of the adaptive filter, updated from time to time (or at each adaptive FIR update) to provide proper frequency shaping for the quantization weight adaptation.

Gain calculation circuitry 422 normalizes the quantization weights, (e.g., based on an average like mean(abs(quantization weights)) to maintain the weights within some predetermined range and thus maintain the weighted quantized transmit signal within a numeric range that is compatible with the adaptive filter 430.

The interference replica system FIG. 4 includes transmit signal combination circuitry 480 configured to generate a combined transmit signal from a plurality of transmit signals (e.g., during dual TX intermodulation) and provide the combined transmit signal to the adaptive quantizer circuitry 420 for quantization. In one example, the transmit signal combination circuitry builds a combined transmit signal during quantization weight adaptation as:

$$n*\text{phiTX1}+m*\text{phiTX2}$$

n, m, integer according to dual TX intermodulation frequencies

For one TX signal, m is set to 0.                     (EQ 1)

The amplitude of the combined transmit signal that is input to the adaptive quantizer 420 is:

$$(\text{abs}(\text{TX1})\hat{\ }p)*(\text{abs}(\text{TX2})\hat{\ }q) \quad (\text{EQ 2a})$$

or $$(\text{abs}(\text{TX1})\hat{\ }p)+(k*\text{abs}(\text{TX2})\hat{\ }q) \quad (\text{EQ 2b})$$

or $$\text{abs}(\text{TX1}+k*\text{TX2})\hat{\ }u \quad (\text{EQ 3})$$

p,q,u, integer k float or fixed point

This is in contrast to abs(TX1)^u, which is used for single TX SIC use cases. The interference replica system of FIG. 4 includes harmonic circuitry 485 configured to multiply a phase of the transmit signal by a selected integer to generate a harmonic signal that is input to the adaptive quantizer circuitry in some use cases in which harmonic distortion is expected.

The interference replica system of FIG. 4 includes image cancellation circuitry 490 configured to generate a mirror signal corresponding to a mirror image of the interference replica signal and combine the mirror signal with the interference replica signal. The image cancellation circuitry 490 is activated in use cases in which the analog in the receive chain is susceptible to generating a mirror image of the received signal in addition to the received signal. For example, the image cancellation circuitry 490 may be activated when the transceiver is operating in a carrier aggregation mode with two or more receive chains.

In the example interference replica system of illustrated in FIG. 4, the adaptive quantizer 420 includes three quantization weights associated with three respective amplitude segments and three quantization weight determination circuitries 440(1)-440(3), meaning there is a one-to-one relationship between the number of quantization weight determination circuitries and quantization weights. As the number of segments increases (to increase granularity of the quantization) the number of quantization weight determination circuitries would also increase by the same number. While a one-to-one relationship allows for all the quantization weights to be determined in parallel and simultaneously, this approach may become unacceptably hardware intensive.

Figure 5:
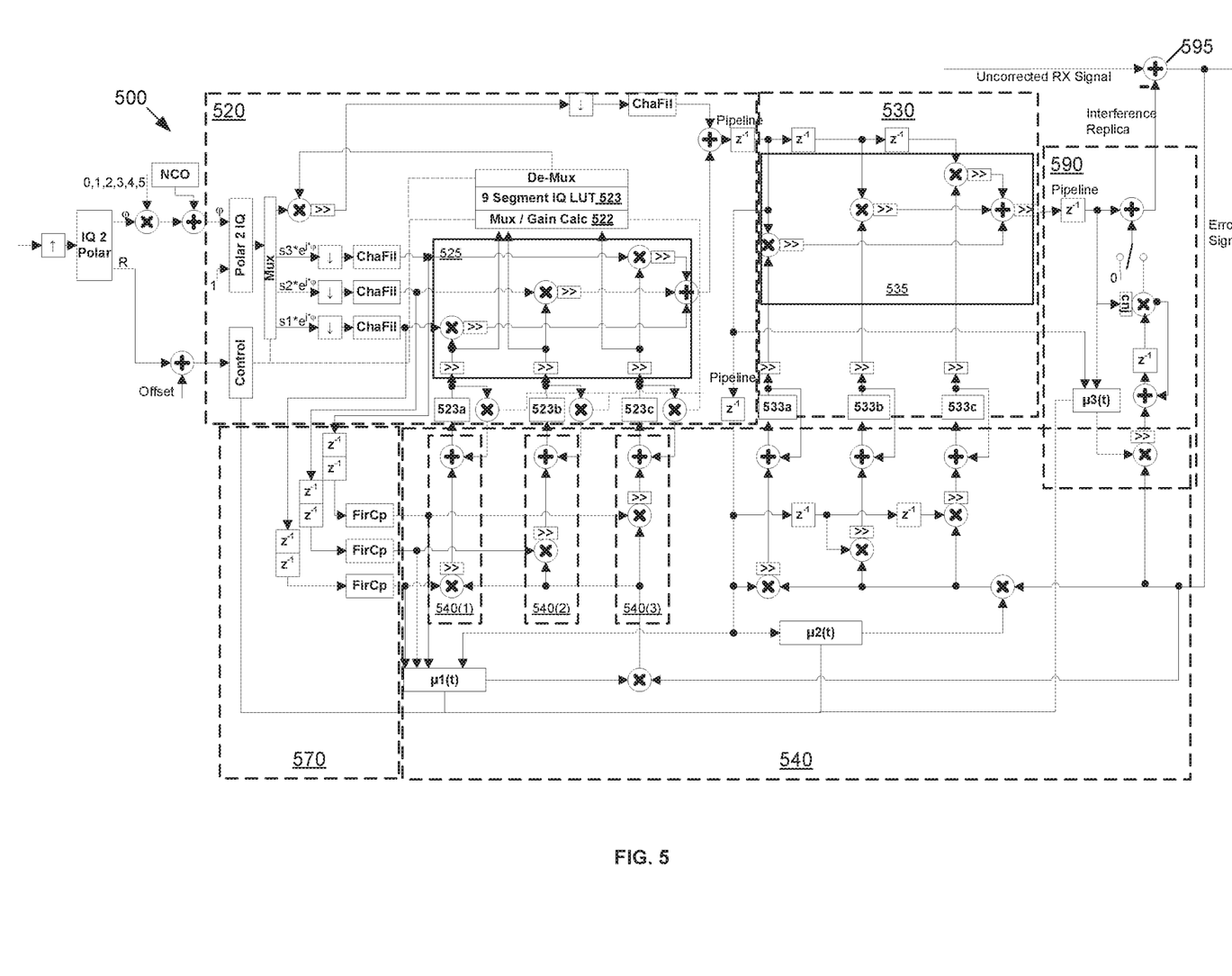
FIG. 5 illustrates an exemplary adaptive self-interference cancellation system in accordance with various aspects described.

FIG. 5 illustrates a transceiver 500 having an interference replica system that functions in many aspects in an analogous manner with respect to the system illustrated in FIG. 4. The functional circuitries and components have been assigned reference numbers having the same tens and ones digits as their counterparts in FIGS. 1-4. In the example of FIG. 5, to conserve hardware, there is not a one-to-one relationship between the number of quantization weight determination circuitries 540 and the number of amplitude segments/quantization weights. In the example of FIG. 5, there are 9 quantization weights corresponding to nine amplitude segments while the adaptation circuitry 540 includes just three quantization weight determination circuitries. Subsets of the quantization weights are determined in an alternating fashion by the quantization weight determination circuitries as follows.

A LUT 523 configured to store the nine quantization weights or segments is initialized with initial values. In one example the initial values may be selected to represent a linear response like 1,1,1,2,2,2,3,3,3, or random values, or the values that were stored in the LUT at the end of prior transceiver operation. In one example, the initial values are based on a coarse quantization weight determination. The adaptation circuitry 540 adapts the quantization weights 523a-523c three at a time while adapting the three filter weights of the adaptive filter 530 in parallel for a 100-1000 time samples. The adaptive quantizer 520 quantizes the transmit signal into just three segments, each corresponding to a combination of three LUT entries or quantization weights. The three "coarse" quantization weights determined at the expiration of this time period are copied into the nine entries of the adaptive LUT as follows. The first quantization weight is copied into the first 3 entries of the adaptive LUT, the second quantization weight is copied into the second 3 entries (4-6) of the adaptive LUT, and the third quantization weight is copied into the last three entries (7-9) of the adaptive LUT.

After populating the adaptive LUT with these coarse quantization weights, operation of the interference replica system is switched to an alternating mode in which three finer grained quantization weights are determined for a portion of the transmit signal that corresponds to the three "adapting" quantization weights that are being adjusted. For example, when the first three quantization weights are being adapted, the adaptive quantizer will quantize the transmit signal in the first three amplitude segments while not quantizing in the other segments and the quantization weights 4-9 will be kept constant. When the second three quantization weights are being adapted, the adaptive quantizer will quantize the transmit signal in the second set of three amplitude segments 4-6 while not quantizing in the transmit signal in other segments and the quantization weights 1-3 and 7-9 will be kept constant. When the third three quantization weights are being adapted, the adaptive quantizer will quantize the transmit signal in the third set of three amplitude segments 7-9 while not quantizing in the transmit signal in other segments and the quantization weights 1-6 will be kept constant. The alternating determination of the quantization weights is performed in parallel with adaptation of filter weights of the adaptive filter 530. This alternating approach is continued until the adaptation of the quantization weights is sufficiently accurate and the adaptation of the quantization weights is halted.

In one example, after the quantization weights are determined, the adaptation of the filter weights for the adaptive filter 530 continues to keep track on slight phase and frequency, sample rate drifts. The quantization weights 523 may be periodically adjusted as desired. The alternating approach of FIG. 5 enables a very low power and die size consuming solution for a nine entry adaptive LUT, while providing faster settling than without the initial coarse quantization weight determination.

During adaptation of the quantization weights, the segmented streams with normalized amplitude of the quantized transmit signal may be synced by the sync circuitry 570. The sync circuitry 570 includes a replica of the adaptive filter circuitry 530 in a signal path for each amplitude segment. The sync circuitry also includes, in each signal path, delay elements corresponding to a number of delay elements in a signal path that conducts the weighted quantized signal to the adaptive filter 530. It can be seen in FIG. 5 that there are two parallel "pipeline" elements between the quantizer circuitry 520 and the adaptive filter 530 and also a third pipeline element between the adaptive filter 530 and the image cancellation circuitry 590. The two delay elements in the sync circuitry signal paths account for one of the parallel pipeline elements and the third pipeline element. The sync circuitry 570 includes effects of decimation filters, channel filters, and a copy of the adaptive filter. The copy of the adaptive filter (FirCP) may be updated as the adaptive filter 530 is modified during training. The sync circuitry 570 provides proper frequency shaped and proper timing aligned signals from perspective of the error signal, enabling enhanced adaptation conditions for the quantization weights. In the illustrated example, the adaptive filter 530 is a FIR filter with three filter taps. FirCp in the sync circuitry 570 is a copy of the adaptive filter, updated from time to time (or at each adaptive FIR update) to provide proper frequency shaping for the quantization weight adaptation.

Figure 6:
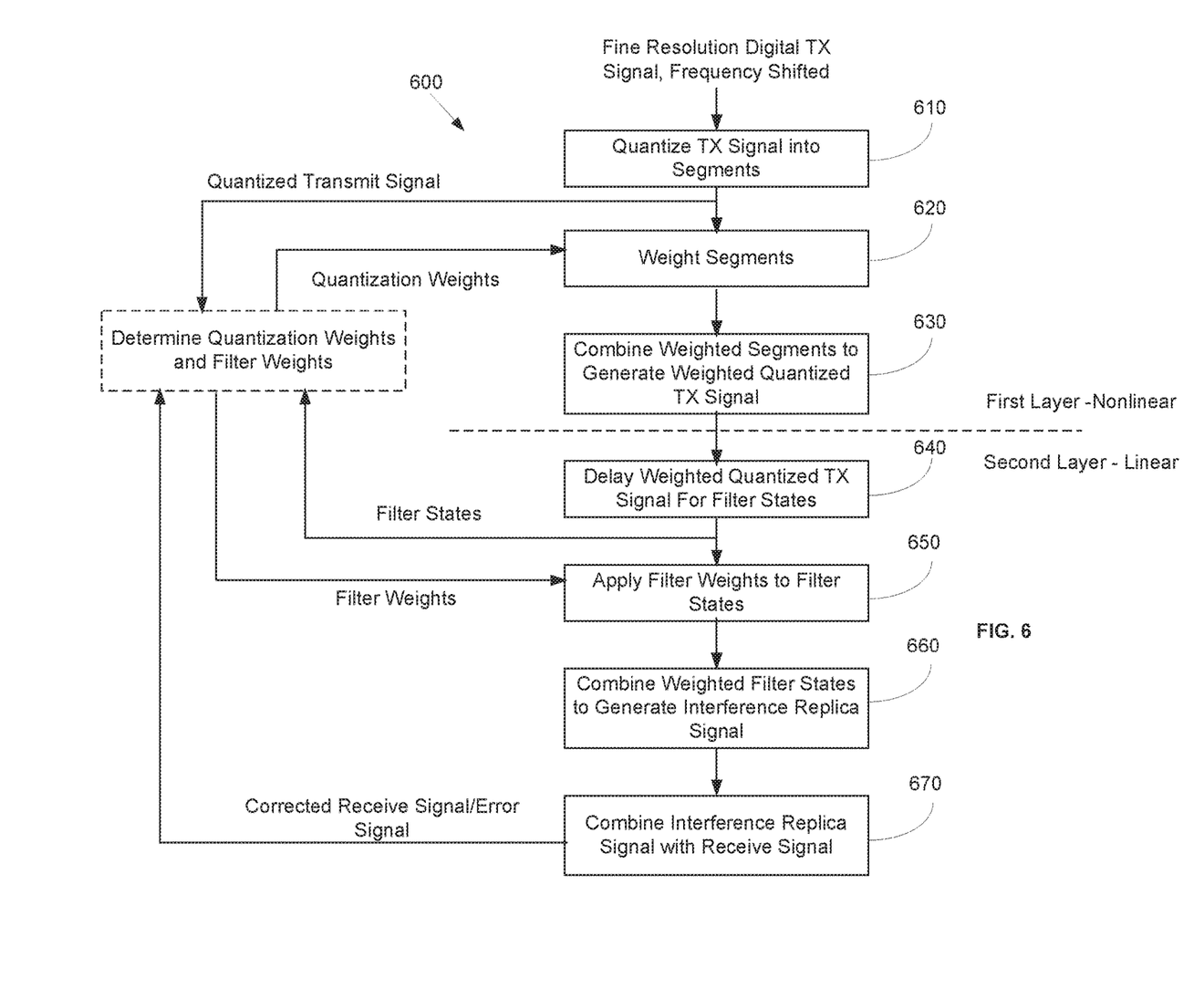
FIG. 6 illustrates an exemplary flow diagram of an exemplary method of adaptively cancelling self-interference in accordance with various aspects described.

FIG. 6 illustrates a flow diagram outlining an example dual layer SIC process 600 that may be implemented by the systems of FIGS. 1-5. The process begins with a fine resolution digital TX signal. The TX signal frequency may be offset in some use cases when the TX and RX frequencies are offset due to properties of a transmit leakage path. In the first layer, at 610 the TX signal is quantized into segments (see, e.g., FIGS. 3A, 3B). At 620, each segment is weighted with a quantization weight and at 630 the weighted segments are combined to generate the weighted quantized transmit signal that models the nonlinear distortion contribution of the transmit signal in the receive signal. The weighted quantized transmit signal is input to the second layer of processing where, at 640, the weighted quantized transmit signal is delayed by a delay chain (see 432, 442 in FIG. 4) to generate filter states. At 650, filter weights are applied to the filter states to model the linear distortion contribution of the transmit signal in the receive chain. At 660 the weighted filter states are combined to generate the interference replica signal which is combined with the receive signal at 670 to generate the corrected receive signal or error signal.

During the process outlined in steps 610-670, the quantization weights and filter weights are being determined (indicated by dashed line element). In one example, adaptation circuitry 440 of FIG. 4 or adaptation circuitry 540 of FIG. 5 determine the quantization weights and filter weights. As discussed above, the quantization weights may be determined simultaneously or in an alternating fashion while the filter weights are determined continuously. The quantization weights may be adapted periodically or continuously. It can be seen that the quantization weights and filter weights are determined based on the quantized transmit signal (e.g., from quantizer portion 420a of FIG. 4), the filter states (e.g., from delay chain 432/442 of FIG. 4), and the corrected receive signal or error signal.

Figure 7:
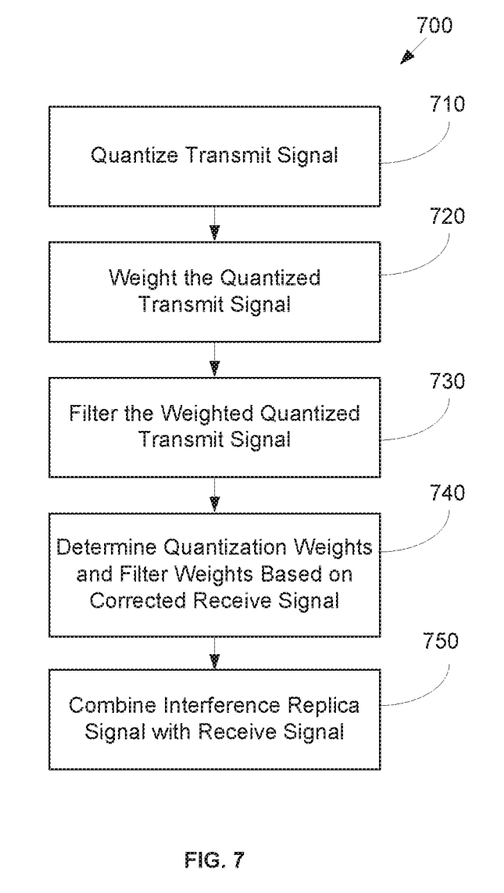
FIG. 7 illustrates an exemplary flow diagram of an exemplary method of adaptively cancelling self-interference in accordance with various aspects described.

FIG. 7 illustrates a flow diagram outlining an exemplary method 700 configured to generated an interference replica signal that estimates interference in a receive signal that is due to a transmit signal. The method includes, at 710, quantizing the transmit signal to generate a quantized transmit signal. At 720, the quantized transmit signal is weighted based on one or more quantization weights. At 730, the method includes filtering the weighted quantized transmit signal based on two or more filter weights to generate the interference replica signal and at 740 the method includes determining the quantization weights and the filter weights based on the corrected receive signal. At 750, the interference replica signal is combined with the receive signal to generate a corrected receive signal.

It can be seen from the foregoing description that the dual layer adaptive SIC cancellation approach can readily approximate strongly nonlinear functions and does not suffer from numeric range problems of high order polynomial approaches, thereby delivering superior suppression for nonlinear SIC cases. The dual layer adaptive SIC cancellation system provides a very hardware efficient and less power intensive solution for the nonlinear self-interference problem. With better SIC, the RF front end isolation specification may be relaxed, offering opportunities to build cheaper modems (by using cheaper front end components with less isolation) and/or enabling faster time to market.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for generating an interference replica signal according to embodiments and examples described herein.

Example 1 is an interference replica system configured to generate an interference replica signal. The interference replica system includes an adaptive quantizer circuitry configured to quantize the transmit signal to generate a quantized transmit signal, wherein the adaptive quantizer weights the quantized transmit signal based on one or more quantization weights; an adaptive filter configured to filter the weighted quantized transmit signal based on two or more filter weights to generate the interference replica signal; a combiner configured to combine the interference replica signal with a receive signal to generate a corrected receive signal; and an adaptation circuitry configured to determine the quantization weights and the filter weights based on the corrected receive signal.

Example 2 includes the subject matter of example 1, including or omitting optional subject matter, wherein the adaptive quantizer includes a quantizer portion configured to generate the quantized transmit signal by quantizing the transmit signal into a set of amplitude segments representing the transmit signal and a weighting circuitry that weights each amplitude segment with an associated quantization weight to generate the weighted quantized transmit signal. The adaptation circuitry includes a plurality of quantization weight determination circuitries, wherein each of the quantization weight determination circuitries is associated with an amplitude segment in the set and is configured to determine the associated quantization weight associated with the amplitude segment.

Example 3 includes the subject matter of example 2, including or omitting optional subject matter, wherein the adaptation circuitry is configured to iteratively adjust the quantization weights and filter weights to minimize an error signal corresponding to the corrected receive signal.

Example 4 includes the subject matter of example 2, including or omitting optional subject matter, wherein the weighting circuitry includes one quantization weight determination circuitry for each quantization weight.

Example 5 includes the subject matter of example 2, including or omitting optional subject matter, wherein the weighting circuitry includes an adaptive lookup table (LUT) includes a first number of quantization weights associated with the first number of respective amplitude segments and the adaptation circuitry includes a second number quantization weight determination circuitries, wherein the second number is less than the first number. The adaptive quantizer is configured to populate the first number of quantization weights with initial quantization weights; and until sufficient quantization weights are determined select a different subset of the second number of quantization weights for adaptation as adapting quantization weights; maintain a remainder of the quantization weights as constant; quantize a portion of transmit signal in adapting amplitude segments associated with adapting quantization weights; and provide the quantized portion transmit signal to the adaptation circuitry such that the second number of adaptation circuities determine the second number of adapting quantization weights.

Example 6 includes the subject matter of example 5, including or omitting optional subject matter, wherein the adaptive quantizer circuitry is configured to determine the initial quantization weights by quantizing the transmit signal in the second number of amplitude segments, where each of the second number of amplitude segments corresponds to a third number of quantization weights; providing the quantized transmit signal to the adaptation circuitry to determine second number of initial quantization weights; and populating sets of third number of quantization weights with a corresponding one of the second number of initial quantization weights.

Example 7 includes the subject matter of example 5, including or omitting optional subject matter, wherein the adaptation circuitry is configured to determine the filter weights while determining each subset of quantization weights.

Example 8 includes the subject matter of example 2, including or omitting optional subject matter, wherein the adaptive quantizer circuitry is configured to adjust the quantization weights determined by the adaptation circuitry to maintain the weights in a predetermined range.

Example 9 includes the subject matter of example 2, including or omitting optional subject matter, further including sync circuitry configured to synchronize the quantized transmit signal provided to the adaptation circuitry with the interference replica signal, wherein the sync circuitry includes, in a signal path for each amplitude segment of the quantized transmit signal, a replica of the adaptive filter circuitry for each of a plurality of quantization weight determination circuitries in the adaptation circuitry.

Example 10 includes the subject matter of example 9, including or omitting optional subject matter, wherein the sync circuitry includes, in the signal path for each amplitude segment of the quantized transmit signal, a plurality of delay elements corresponding to a number of delay elements in a signal path that conducts the weighted quantized signal to the adaptive filter.

Example 11 includes the subject matter of example 1, including or omitting optional subject matter, further including transmit signal combination circuitry configured to generate a combined transmit signal from a plurality of transmit signals and provide the combined transmit signal to the adaptive quantizer circuitry for quantization.

Example 12 includes the subject matter of example 1, including or omitting optional subject matter, further including harmonic circuitry configured to multiply a phase of the transmit signal by a selected integer to generate a harmonic signal that is input to the adaptive quantizer circuitry.

Example 13 includes the subject matter of example 1, including or omitting optional subject matter, further including image cancellation circuitry configured to generate a mirror signal corresponding to a mirror image of the interference replica signal and combine the mirror signal with the interference replica signal.

Example 14 is a method, including generating an interference replica signal that estimates interference in a receive signal that is due to a transmit signal by quantizing the transmit signal to generate a quantized transmit signal; weighting the quantized transmit signal based on one or more quantization weights; filtering the weighted quantized transmit signal based on two or more filter weights to generate the interference replica signal; and determining the quantization weights and the filter weights based on the corrected receive signal; and combining the interference replica signal with the receive signal to generate a corrected receive signal.

Example 15 includes the subject matter of example 14, including or omitting optional subject matter, further including quantizing the transmit signal into a set of a first number of amplitude segments representing the transmit signal; determining quantization weights, each quantization weight being associated with a respective one of the first number of amplitude segments, and weighting each amplitude segment with the associated quantization weight.

Example 16 includes the subject matter of example 15, including or omitting optional subject matter, including determining one or more of the quantization weights in parallel.

Example 17 includes the subject matter of example 15, including or omitting optional subject matter, further including populating the first number of quantization weights with initial quantization weights; populating the filter weights with initial filter weights; and until sufficient quantization weights are determined: selecting a different subset of a second number of quantization weights for adaptation as adapting quantization weights; maintaining a remainder of the quantization weights as constant; quantizing a portion of transmit signal in adapting amplitude segments associated with the adapting quantization weights; and determining the second number of adapting quantization weights based on the quantized portion of the transmit signal.

Example 18 includes the subject matter of example 15, including or omitting optional subject matter, further including synchronizing the quantized transmit with the interference replica signal by filtering the quantized transmit signal with a replica of the adaptive filter circuitry; and using the filtered quantized transmit signal for determining the quantization weights.

Example 19 is an adaptive quantizer circuitry configured to generate a weighted quantized transmit signal that estimates a nonlinear interference signal in a receive chain due to interference by a transmit signal, including a quantizer portion, an adaptive lookup table, a weighting circuitry, and an adaptation circuitry. The quantizer portion is configured to generate a quantized transmit signal by quantizing the transmit signal into a set of amplitude segments representing the transmit signal. The adaptive lookup table (LUT) includes a set of complex quantization weights, each associated with an amplitude segment in the set of amplitude segments. The weighting circuitry multiplies each amplitude segment in the quantized transmit signal by the associated quantization weight to generate the weighted quantized transmit signal, such that the quantized transmit signal comprises a set of weighted amplitude segments representing the transmit signal. The adaptation circuitry includes a plurality of quantization weight determination circuitries, wherein each of the quantization weight determination circuitries is associated with an amplitude segment in the set and is configured to determine a quantization weight associated with the amplitude segment and store the quantization weight in the adaptive LUT.

Example 20 includes the subject matter of example 19, including or omitting optional subject matter, wherein the adaptive LUT includes a first number of quantization weights associated with the first number of respective amplitude segments and the first number of quantization weight determination circuitries.

Example 21 includes the subject matter of example 19, including or omitting optional subject matter, wherein the adaptive LUT includes a first number of quantization weights associated with the first number of respective amplitude segments and the adaptation circuitry includes a second number of quantization weight determination circuitries, wherein the second number is less than the first number. The adaptive quantizer is configured to populate the first number of quantization weights with initial quantization weights and, until sufficient quantization weights are determined, select a different subset of the second number of quantization weights for adaptation as adapting quantization weights; maintain a remainder of the quantization weights as constant; quantize a portion of transmit signal in adapting amplitude segments associated with adapting quantization weights; and provide the quantized portion transmit signal to the adaptation circuitry such that the second number of adaptation circuities determine the second number of adapting quantization weights.

Example 22 includes the subject matter of example 21, including or omitting optional subject matter, wherein the adaptive quantizer circuitry is configured to determine the initial quantization weights by quantizing the transmit signal in the second number of amplitude segments, where each of the second number of amplitude segments corresponds to a third number of quantization weights; providing the quantized transmit signal to the adaptation circuitry such that the adaptation circuitry determines second number of initial quantization weights; and populating sets of the third number of quantization weights with a corresponding one of the second number of initial quantization weights.

Example 23 includes the subject matter of example 21, including or omitting optional subject matter, wherein the adaptive quantizer circuitry is configured to adjust the quantization weights determined by the adaptation circuitry to maintain the weights in a predetermined range.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. The various illustrative logics, logical blocks, modules, and circuits described in connection with aspects disclosed herein can be implemented or performed with a general purpose processor executing instructions stored in computer readable medium.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. The use of the phrase "one or more of A, B, or C" is intended to include all combinations of A, B, and C, for example A, A and B, A and B and C, B, and so on.

What is claimed is:

1. An interference replica system configured to generate an interference replica signal, the interference replica system comprising:
    an adaptive quantizer circuitry configured to quantize the transmit signal to generate a quantized transmit signal, wherein the adaptive quantizer weights the quantized transmit signal based on one or more quantization weights;
    an adaptive filter configured to filter the weighted quantized transmit signal based on two or more filter weights to generate the interference replica signal;
    a combiner configured to combine the interference replica signal with a receive signal to generate a corrected receive signal; and
    an adaptation circuitry configured to determine the quantization weights and the filter weights based on the corrected receive signal.

2. The interference replica system of claim 1, wherein:
    the adaptive quantizer comprises:
        a quantizer portion configured to generate the quantized transmit signal by quantizing the transmit signal into a set of amplitude segments representing the transmit signal; and
        a weighting circuitry that weights each amplitude segment with an associated quantization weight to generate the weighted quantized transmit signal;
    the adaptation circuitry comprises a plurality of quantization weight determination circuitries, wherein each of the quantization weight determination circuitries is associated with an amplitude segment in the set and is configured to determine the associated quantization weight associated with the amplitude segment.

3. The interference replica system of claim 2, wherein the adaptation circuitry is configured to iteratively adjust the quantization weights and filter weights to minimize an error signal corresponding to the corrected receive signal.

4. The interference replica system of claim 2, wherein the weighting circuitry comprises one quantization weight determination circuitry for each quantization weight.

5. The interference replica system of claim 2, wherein:
    the weighting circuitry comprises an adaptive lookup table (LUT) comprises a first number of quantization weights associated with the first number of respective amplitude segments; and
    the adaptation circuitry comprises a second number quantization weight determination circuitries, wherein the second number is less than the first number,
    further wherein the adaptive quantizer is configured to:
        populate the first number of quantization weights with initial quantization weights; and
        until sufficient quantization weights are determined:
            select a different subset of the second number of quantization weights for adaptation as adapting quantization weights;
            maintain a remainder of the quantization weights as constant;
            quantize a portion of transmit signal in adapting amplitude segments associated with adapting quantization weights; and
            provide the quantized portion transmit signal to the adaptation circuitry such that the second number of adaptation circuities determine the second number of adapting quantization weights.

6. The interference replica system of claim 5, wherein the adaptive quantizer circuitry is configured to determine the initial quantization weights by:
    quantizing the transmit signal in the second number of amplitude segments, where each of the second number of amplitude segments corresponds to a third number of quantization weights;
    providing the quantized transmit signal to the adaptation circuitry to determine second number of initial quantization weights; and
    populating sets of third number of quantization weights with a corresponding one of the second number of initial quantization weights.

7. The interference replica system of claim 5, wherein the adaptation circuitry is configured to determine the filter weights while determining each subset of quantization weights.

8. The interference replica system of claim 2, wherein the adaptive quantizer circuitry is configured to adjust the quantization weights determined by the adaptation circuitry to maintain the weights in a predetermined range.

9. The interference replica system of claim 2, further comprising sync circuitry configured to synchronize the quantized transmit signal provided to the adaptation circuitry with the interference replica signal, wherein the sync circuitry comprises, in a signal path for each amplitude segment of the quantized transmit signal, a replica of the adaptive filter circuitry for each of a plurality of quantization weight determination circuitries in the adaptation circuitry.

10. The interference replica system of claim 9, wherein the sync circuitry comprises, in the signal path for each amplitude segment of the quantized transmit signal, a plurality of delay elements corresponding to a number of delay elements in a signal path that conducts the weighted quantized signal to the adaptive filter.

11. The interference replica system of claim 1, further comprising transmit signal combination circuitry configured to generate a combined transmit signal from a plurality of transmit signals and provide the combined transmit signal to the adaptive quantizer circuitry for quantization.

12. The interference replica system of claim 1, further comprising harmonic circuitry configured to multiply a phase of the transmit signal by a selected integer to generate a harmonic signal that is input to the adaptive quantizer circuitry.

13. The interference replica system of claim 1, further comprising image cancellation circuitry configured to:
generate a mirror signal corresponding to a mirror image of the interference replica signal; and
combine the mirror signal with the interference replica signal.

14. A method, comprising:
generating an interference replica signal that estimates interference in a receive signal that is due to a transmit signal by:
quantizing the transmit signal to generate a quantized transmit signal;
weighting the quantized transmit signal based on one or more quantization weights;
filtering the weighted quantized transmit signal based on two or more filter weights to generate the interference replica signal; and
determining the quantization weights and the filter weights based on the corrected receive signal; and
combining the interference replica signal with the receive signal to generate a corrected receive signal.

15. The method of claim 14, further comprising:
quantizing the transmit signal into a set of a first number of amplitude segments representing the transmit signal;
determining quantization weights, each quantization weight being associated with a respective one of the first number of amplitude segments, and
weighting each amplitude segment with the associated quantization weight.

16. The method of claim 15, comprising determining one or more of the quantization weights in parallel.

17. The method of claim 15, further comprising:
populating the first number of quantization weights with initial quantization weights;
populating the filter weights with initial filter weights; and
until sufficient quantization weights are determined:
selecting a different subset of a second number of quantization weights for adaptation as adapting quantization weights;
maintaining a remainder of the quantization weights as constant;
quantizing a portion of transmit signal in adapting amplitude segments associated with the adapting quantization weights; and
determining the second number of adapting quantization weights based on the quantized portion of the transmit signal.

18. The method of claim 15, further comprising synchronizing the quantized transmit with the interference replica signal by:
filtering the quantized transmit signal with a replica of the adaptive filter circuitry; and
using the filtered quantized transmit signal for determining the quantization weights.

19. An adaptive quantizer circuitry configured to generate a weighted quantized transmit signal that estimates a non-linear interference signal in a receive chain due to interference by a transmit signal, comprising:
a quantizer portion configured to generate a quantized transmit signal by quantizing the transmit signal into a set of amplitude segments representing the transmit signal;
an adaptive lookup table (LUT) comprising a set of complex quantization weights, each associated with an amplitude segment in the set of amplitude segments;
a weighting circuitry that multiplies each amplitude segment in the quantized transmit signal by the associated quantization weight to generate the weighted quantized transmit signal, such that the quantized transmit signal comprises a set of weighted amplitude segments representing the transmit signal; and
adaptation circuitry comprising a plurality of quantization weight determination circuitries, wherein each of the quantization weight determination circuitries is associated with an amplitude segment in the set and is configured to determine a quantization weight associated with the amplitude segment and store the quantization weight in the adaptive LUT.

20. The adaptive quantizer circuitry of claim 19, wherein the adaptive LUT comprises a first number of quantization weights associated with the first number of respective amplitude segments and the first number of quantization weight determination circuitries.

21. The adaptive quantizer circuitry of claim 19, wherein:
the adaptive LUT comprises a first number of quantization weights associated with the first number of respective amplitude segments; and
the adaptation circuitry comprises a second number of quantization weight determination circuitries, wherein the second number is less than the first number,
further wherein the adaptive quantizer is configured to:
populate the first number of quantization weights with initial quantization weights; and
until sufficient quantization weights are determined:
select a different subset of the second number of quantization weights for adaptation as adapting quantization weights;
maintain a remainder of the quantization weights as constant;
quantize a portion of transmit signal in adapting amplitude segments associated with adapting quantization weights; and
provide the quantized portion transmit signal to the adaptation circuitry such that the second number of adaptation circuities determine the second number of adapting quantization weights.

22. The adaptive quantizer circuitry of claim 21, wherein the adaptive quantizer circuitry is configured to determine the initial quantization weights by:
quantizing the transmit signal in the second number of amplitude segments, where each of the second number of amplitude segments corresponds to a third number of quantization weights;

providing the quantized transmit signal to the adaptation circuitry such that the adaptation circuitry determines second number of initial quantization weights; and populating sets of the third number of quantization weights with a corresponding one of the second number of initial quantization weights.

23. The adaptive quantizer circuitry of claim 21, wherein the adaptive quantizer circuitry is configured to adjust the quantization weights determined by the adaptation circuitry to maintain the weights in a predetermined range.

* * * * *